(12) United States Patent
Yudate

(10) Patent No.: US 8,979,554 B2
(45) Date of Patent: Mar. 17, 2015

(54) CONNECTOR OF ELECTRONIC DEVICE, PLUG OF ELECTRONIC DEVICE, AND WATERPROOF STRUCTURE OF ELECTRONIC DEVICE

(75) Inventor: Shinya Yudate, Matsuyama (JP)

(73) Assignee: Ex Company Limited, Matsuyama-shi (JP)

( * ) Notice: Subject to any disclaimer, the term of this patent is extended or adjusted under 35 U.S.C. 154(b) by 0 days.

(21) Appl. No.: 14/001,637

(22) PCT Filed: Feb. 22, 2012

(86) PCT No.: PCT/JP2012/001185
§ 371 (c)(1),
(2), (4) Date: Aug. 26, 2013

(87) PCT Pub. No.: WO2012/124261
PCT Pub. Date: Sep. 20, 2012

(65) Prior Publication Data
US 2013/0330951 A1  Dec. 12, 2013

(30) Foreign Application Priority Data
Mar. 16, 2011 (JP) .................................. 2011-057441

(51) Int. Cl.
*H01R 12/00* (2006.01)
*H01R 13/52* (2006.01)
(Continued)

(52) U.S. Cl.
CPC ............ *H01R 13/52* (2013.01); *H01R 13/5202* (2013.01); *H01R 13/5213* (2013.01); *H04M 1/0274* (2013.01); *H01R 13/5219* (2013.01); *H04M 1/18* (2013.01)
USPC .......... 439/76.1; 439/271; 439/587; 439/278; 439/732; 439/281

(58) Field of Classification Search
USPC ................. 439/76.1, 271, 278, 281, 587, 732
See application file for complete search history.

(56) References Cited

U.S. PATENT DOCUMENTS 5,125,848 A   6/1992 Zimmerly
5,580,266 A * 12/1996 Shelly ........................... 439/281
(Continued)

FOREIGN PATENT DOCUMENTS

JP      07-106015 A    4/1995
JP      2009-111720 A  5/2009
(Continued)

OTHER PUBLICATIONS

International Search Report dated May 1, 2012, issued in corresponding application No. PCT/JP2012/001185.

*Primary Examiner* — Tho D Ta
(74) *Attorney, Agent, or Firm* — Westerman, Hattori, Daniels & Adrian, LLP

(57) ABSTRACT

Provided is a connector of an electronic device, in which a space in a housing of the electronic device can be enlarged, the number of circuits can be increased, a battery can be made larger, and the housing of the electronic device can be made thinner and more compact. The connector of the electronic device is provided with a substantially cylindrical case; connector-side terminals introduced into the case; and a sealing material that is formed in the vicinity of the end of the case on a plug insertion side so as to protrude to the plug insertion side, wherein a first convex stripe is formed along the inner circumference of the protruding section of the sealing material, and the first convex stripe is formed so as to be circumferentially pressed against and brought into contact with an outer circumferential surface of a part of a cover to be inserted.

14 Claims, 9 Drawing Sheets

(51) Int. Cl.
*H04M 1/02* (2006.01)
*H04M 1/18* (2006.01)

(56) References Cited

U.S. PATENT DOCUMENTS

| | | | | |
|---|---|---|---|---|
| 5,814,765 | A | * | 9/1998 | Bauer et al. .................. 439/76.1 |
| 5,980,278 | A | * | 11/1999 | Winkler ........................ 439/271 |
| 2006/0286862 | A1 | | 12/2006 | Lubinsky et al. |
| 2009/0111539 | A1 | | 4/2009 | Matsuda et al. |
| 2009/0191927 | A1 | | 7/2009 | Hong |
| 2009/0215300 | A1 | | 8/2009 | Shiga |
| 2009/0305569 | A1 | | 12/2009 | Chazottes et al. |

FOREIGN PATENT DOCUMENTS

| | | |
|---|---|---|
| JP | 2009-176734 A | 8/2009 |
| JP | 2009-200010 A | 9/2009 |
| WO | 2007/083003 | 7/2007 |

* cited by examiner (a)

(b)

(a)

(b)

(a)

(b)

(a)

(b)

CONNECTOR OF ELECTRONIC DEVICE, PLUG OF ELECTRONIC DEVICE, AND WATERPROOF STRUCTURE OF ELECTRONIC DEVICE

TECHNICAL FIELD

The present invention relates to a connector of a waterproof electronic device such as charging connector for mobile phone, a plug of an electronic device and a waterproof structure of an electronic device.

BACKGROUND ART

It has been widely practiced in electronic devices such as mobile phones or the like provided with a connectors for charging and data transfer to adopt a waterproof structure realized by fitting a cover having an O-ring in an opening area of a housing of an electronic device provided with connector in order to prevent malfunction caused by intrusion of water into the connector.

A cover 210 in this waterproof structure is as shown in FIG. 9(a) and includes a cover main body 211 of a rectangular shape in the front view, and a substantially elliptical projection 212 arranged to protrude to an insertion side from the cover main body 211, wherein a recessed groove 213 is formed in the outer periphery of the projection 212. An O-ring 214 is fitted and installed along the recessed groove 213.

A housing of an electronic device is also provided with a bottomed opening 220 of a substantially elliptical cylindrical shape and a hole 222 is formed in a rear wall 221 of the opening 220, as shown in FIG. 9(b). A connector 230 is placed to face the rear side of the opening 220 so that a tip end of the connector is placed in the hole 222. The connector 230 is connected to a circuit board 233 by a shell 231 and a contact terminal 232 thereof.

Then, the cover 210 is fitted in the opening 220 in such a manner that the O-ring 214 is pressed against and brought into contact with an inner circumferential surface 223 of the opening 120 throughout the entire circumference, whereby preventing water from intruding into the inside beyond an area in which the O-ring 214 and the inner circumferential surface 223 are in contact with each other. Note that a similar structure is disclosed in Patent Document 1.

CITATION LIST

Patent Literature

Patent Document 1 Japanese Unexamined Patent Application Publication No. 2009-111720

SUMMARY OF INVENTION

Technical Problem

The cover 210 in the above waterproof structure is a so-called four-layer structure consisting of the cover main body 211, a portion of the projection 212 closer to the cover main body 111 than the recessed groove 213, the O-ring 214, and a portion of the projection 212 closer to the insertion side than the recessed groove 213, and has a thickness t1' that is as thick as about 3 mm. Accordingly, a space for installing the opening 220 and the connector 230 requires a long depth t2' of, for example, about 8.5 mm and occupies a large area in a housing of an electronic device. Furthermore, due to the necessity of providing the opening 220 for accommodating this large cover 210, the electronic device results in having a thick housing.

In other words, because the connector 230 needs to be placed in a deeper position than the thick cover 210, a remaining space in the housing of the electronic device is reduced and restriction is imposed on designing the layout of a circuit board and wiring therefor, increasing the number of circuits to be mounted and enlarging the size of a battery, which is problematic. In addition, it is also difficult to make the housing of the electronic device thinner and more compact. Furthermore, the cover 210 in which the O-ring 214 is fitted in the recessed groove 213 needs to be large and requires a step of fitting the O-ring 214 so that a problem arises with increased manufacturing costs and reduction of the yield due to an increase in the number of parts.

The present invention was proposed to solve the above problems and aims at providing a connector of an electronic device, a plug of an electronic device and a waterproof structure of an electronic device in which a remaining space in the housing of an electronic device can be enlarged, the degree of freedom in designing the layout of a circuit board and wiring therefor can be improved, the number of circuits to be mounted can be increased, a battery can be made larger, and a housing of an electronic device can be made thinner and more compact. Another object of the present invention is to provide a connector of an electronic device, a plug of an electronic device and a waterproof structure of an electronic device in which manufacturing costs of a cover can be reduced with an increased yield.

Solution to Problem

A connector of an electronic device according to the present invention comprises a substantially cylindrical case, connector-side terminals inserted into the case, and a sealing material that is arranged in the vicinity of the end of the case on a plug insertion side so as to protrude to the plug insertion side, and that is formed around an outer circumference of the case, wherein a first convex stripe is formed along an inner circumference of the protruding section of the sealing material, and the first convex stripe is formed so as to be pressed against and brought into contact with an outer circumferential surface of a part of a cover to be inserted.

In this structure, waterproof sealing is applied by bringing the first convex stripe of the sealing material, which protrudes to the plug insertion side in the outer circumference of the case, into contact with a part of the cover and therefore the cover is made thinner, whereby allowing installation of the connector in a position closer to an opening edge of the housing of an electronic device. Accordingly, it is possible to enlarge a remaining space in the housing of an electronic device, to improve the degree of freedom in designing the layout of a circuit board and wiring therefor, to increase the number of circuits to be mounted, and to make a battery larger. It is also possible to provide a cover in a simplified structure and make the housing of an electronic device thinner and more compact. Manufacturing costs of the cover can also be reduced with an increased yield. In addition, the sealing material can be visually observed by leaving the cover open, so that it is possible to attract user's attention to the characteristics of the waterproof structure.

The connector of an electronic device according to the present invention is characterized in that the first convex stripe is formed so as to be circumferentially pressed against and brought into contact with both an outer circumferential surface of a part of the plug and an outer circumferential surface of a part of the inserted cover.

In this structure, owing to the first convex stripe, waterproof measures can be taken for both cases with the cover attached and with the plug inserted.

The connector of an electronic device according to the present invention is characterized in that the first convex stripe is formed into a substantially dorsal fin shape in the cross sectional view with a front side thereof disposed to the plug insertion side.

In this structure, the first convex stripe, which often is rubbed against a part of the cover and a part of a plug, can be brought into contact with them in a form of falling down to a direction opposite to the plug insertion side, whereby making it possible to prevent abrasion of the first convex stripe and enhance durability thereof. In this regard, the waterproof structure provided by the cover of the above conventional example is accompanied by accelerated abrasion of the O-ring resulting from opening/closing operation and inferior durability.

The connector of an electronic device according to the present invention is characterized in that a second convex stripe is formed along the outer circumference of the sealing material and the second convex stripe is formed so as to be circumferentially pressed against and brought into contact with an inner circumferential surface of a mounting part of the housing of an electronic device.

In this structure, waterproof sealing is applied by bringing the inner circumferential surface of the mounting part of the housing of an electronic device and the second convex stripe into contact with each other, whereby allowing prevention of water intrusion from a space between the housing and the sealing material into the housing. Also, owing to the sealing material placed in the vicinity of the end of a connector case, collective waterproof measures can be taken at the same time against a water intruding path from the cover into the connector and against a water intruding path from a space between the housing of an electronic device and the connector into the housing.

The connector of an electronic device according to the present invention is characterized in that the second convex stripe is formed in a position drawn to a direction opposite to the plug insertion side more than the first convex stripe.

In this structure, when the connector is inserted into the mounting part of the housing from a direction opposite to the plug insertion side, an insertion distance of the connector that is inserted while the inner circumferential surface of the mounting part is pressed by the second convex stripe can be made shorter, which makes it easier to insert the connector.

The connector of an electronic device according to the present invention is characterized in that a convex that is shorter than the second convex stripe is formed along the outer circumference of the sealing material in a position drawn to the plug insertion side more than the second convex stripe.

In this structure, the convex is used to function as a relief to come in contact with the inner circumferential surface of the mounting part when the sealing material attached to the case is inserted into the mounting part, and a clearance is provided by making a basic outer diameter of the sealing material attached to the case slightly smaller than an inner diameter of the inner circumferential surface of the mounting part of the housing of an electronic device, so that the sealing material attached to the case can be inserted into the mounting part in a simple manner and stabilized in a normal position without being distorted.

The connector of an electronic device according to the present invention is characterized in that the case is made of a resin and the sealing material is made of a softer resin than the resin of the case.

In this structure, the shape of the case can be maintained and workability is improved in installation operation or other operation by using, for example, a rigid resin for the case and a softer resin than the resin of the case for the sealing material, while making it possible to prevent water intrusion from a space between the housing of an electronic device and the sealing material more reliably owing to elasticity of the sealing material.

The connector of an electronic device according to the present invention is characterized in that the sealing material made of the above resin is welded to the case made of the above resin.

In this structure, it is possible to completely prevent water intrusion from a space between the case and the sealing material.

The connector of an electronic device according to the present invention is characterized in that another sealing material is provided in an inner area of the case.

In this structure, in the event of malfunction occurring in the sealing material when the connector is released or other cases, it is possible to prevent water intrusion into a circuit board provided in an inner area of the connector more reliably, and a waterproof measure can be taken against forgetting to close the cover. Furthermore, costs can be reduced by providing another sealing material without insert-molding because complicated metal molds are unnecessary, whereby making it possible to reduce the degradation rate and increase the degree of freedom in designing the shape of the connector.

A plug of an electronic device according to the present invention is characterized in that the plug is inserted into a connector comprising: a substantially cylindrical case; connector-side terminals introduced into the case; a sealing material that is formed in the vicinity of the end of the case on a plug insertion side so as to protrude to the plug insertion side, and that is formed around the outer circumference of the case; and a first convex stripe formed along the inner circumference of the protruding section of the sealing material, wherein the plug is inserted in such a manner that the first convex stripe is circumferentially pressed against and brought into contact with an outer circumferential surface of a part of the plug.

In this structure, waterproof sealing is applied by bringing the first convex stripe of the sealing material protruding to the plug insertion side on the outer circumference of the case into contact with a part of the plug so that a waterproof measure can be taken when the plug is inserted. This structure further allows installation of the connector in a position closer to an opening edge of the housing of an electronic device, whereby making it possible to enlarge a remaining space in the housing of an electronic device, improve the degree of freedom in designing the layout of a circuit board and wiring therefor, increasing the number of circuits to be mounted and making a battery larger. The housing of an electronic device can also be made thinner and more compact, while reducing manufacturing costs of the cover with an improved yield.

A waterproof structure of an electronic device according to the present invention is provided with a connector made of a substantially cylindrical case, connector-side terminals introduced into the case, and a sealing material that is formed in the vicinity of the end of the case on a plug insertion side so as to protrude to a plug insertion side, and that is formed around the outer circumference of the case, and a cover to be partially inserted into the connector, wherein a first convex stripe is formed along the inner circumference of the protruding section of the sealing material and the first convex stripe is circumferentially pressed against and brought into contact with an outer circumferential surface of a part of the cover to be inserted into the connector.

In this structure, owing to waterproof sealing applied by bringing the sealing material protruding to the plug insertion side on the outer circumference of the case into contact with a part of the cover, the cover can be thin and the connector can be arranged in a position closer to an opening edge of the housing of an electronic device. Accordingly, it is possible to enlarge a remaining space in the housing of an electronic device, to improve the degree of freedom in designing the layout of a circuit board and wiring therefor, to increase the number of circuits to be mounted, and to make a battery larger. The cover can also be provided in a simplified structure and the housing of an electronic device can be made thinner and more compact, while reducing manufacturing costs of the cover with an improved yield. It is also possible to draw user's attention to the characteristics of the waterproof structure because the sealing material can be visually observed by leaving the cover open.

Advantage Effects of Invention

According to the present invention, the cover can be thin and the connector can be arranged in a position closer to an opening edge of the housing of an electronic device. As a result, it is possible to enlarge a remaining space in the housing of an electronic device, to improve the degree of freedom in designing the layout of a circuit board and wiring therefor, to increase the number of circuits to be mounted, and to make a battery larger. The cover can also be provided in a simplified structure and the housing of an electronic device can be made thinner and more compact, while reducing manufacturing costs of the cover with an improved yield. It is also possible to attract user's attention to the characteristics of the waterproof structure to the use because the sealing material can be visually observed by leaving the cover open. An internal circuit can also be prevented from being damaged due to water intrusion into the connector.

DESCRIPTION OF EMBODIMENTS

Next, a connector and a plug of an electronic device according to an embodiment of the present invention will be explained.

Connector and Plug of Electronic Device According to Embodiment

Figure 1:
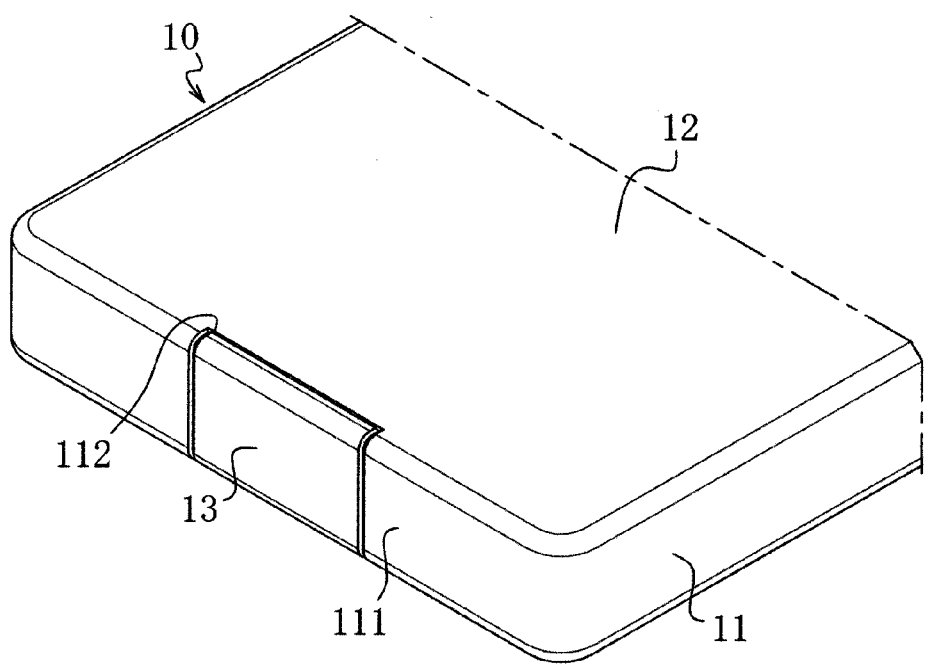
FIG. 1(a) is a partial perspective view of a hosing for accommodating a connector of an electronic device according to a first embodiment.
FIG. 1(b) is a partial plan view thereof.
Figure 1:
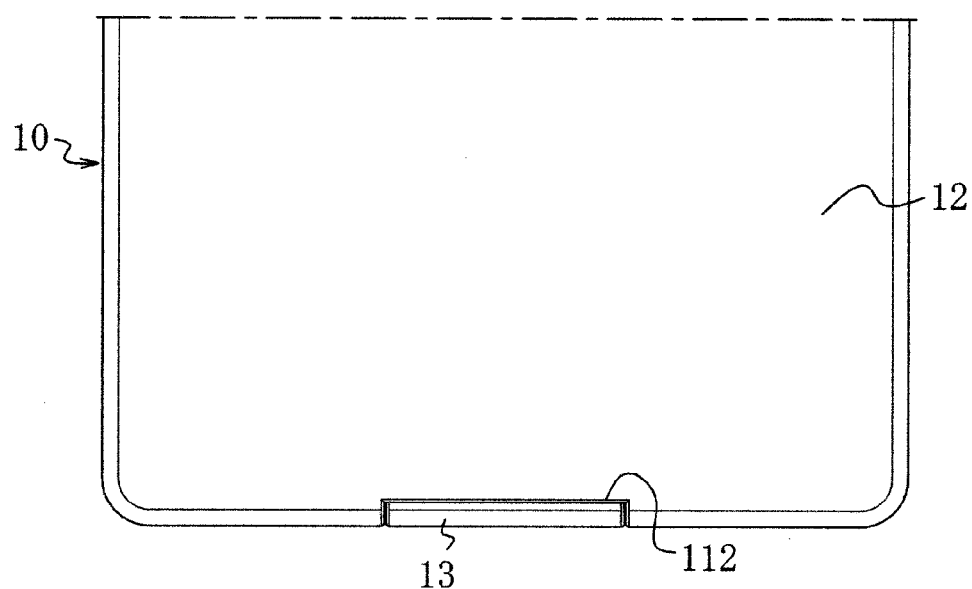
Figure 2:
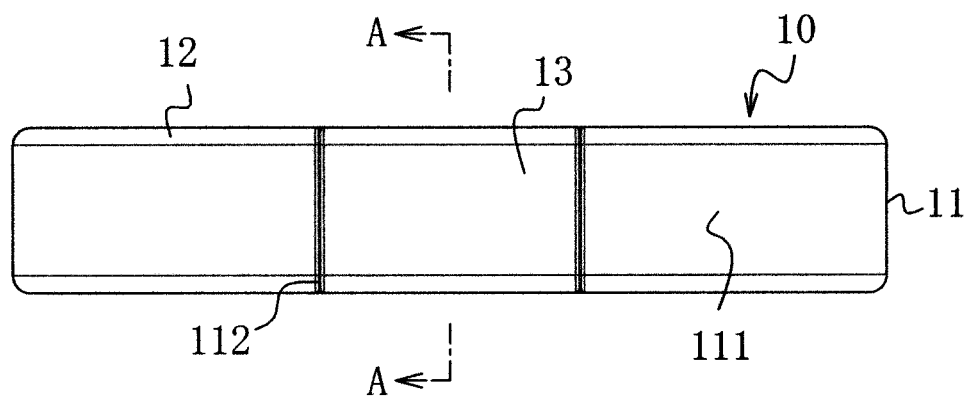
FIG. 2(a) is a front view of the housing for accommodating the connector of an electronic device according to the first embodiment.
FIG. 2(b) is a front view in which a cover is removed from the housing of FIG. 2(a).
Figure 2:
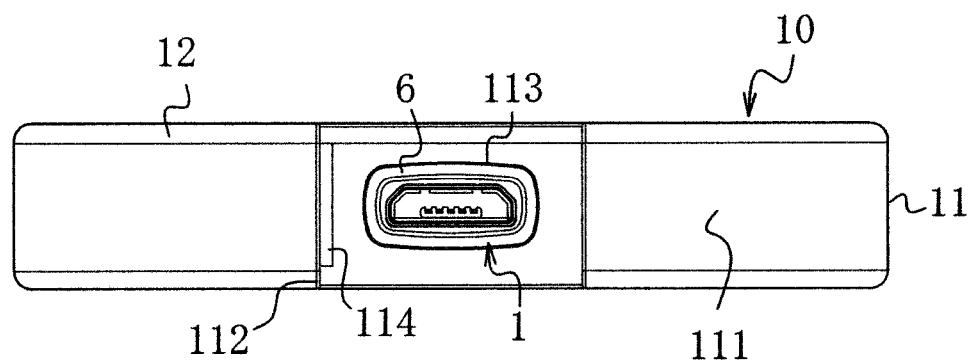
Figure 3:
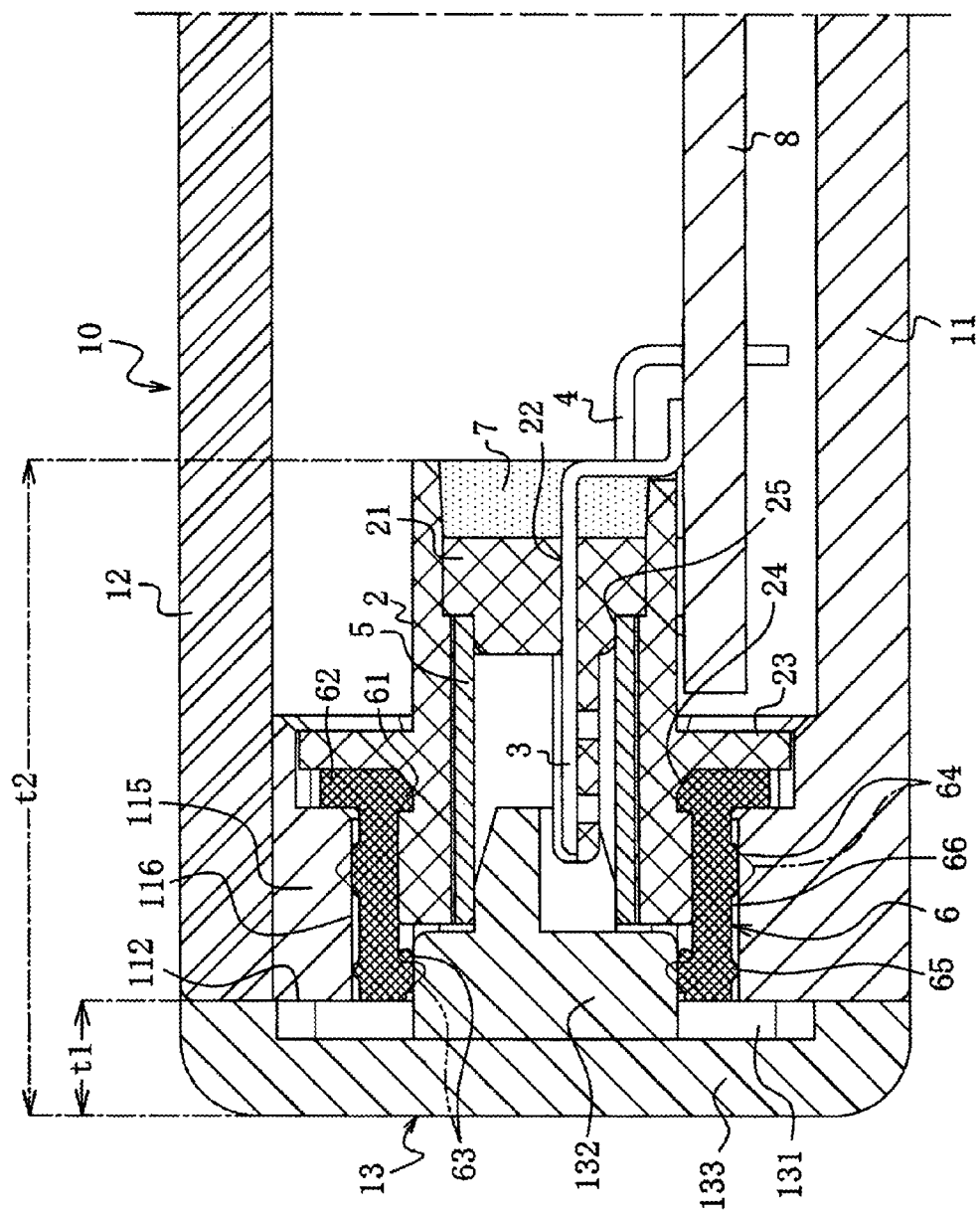
FIG. 3 is a cross sectional view along A-A line of FIG. 2(a).
Figure 5:
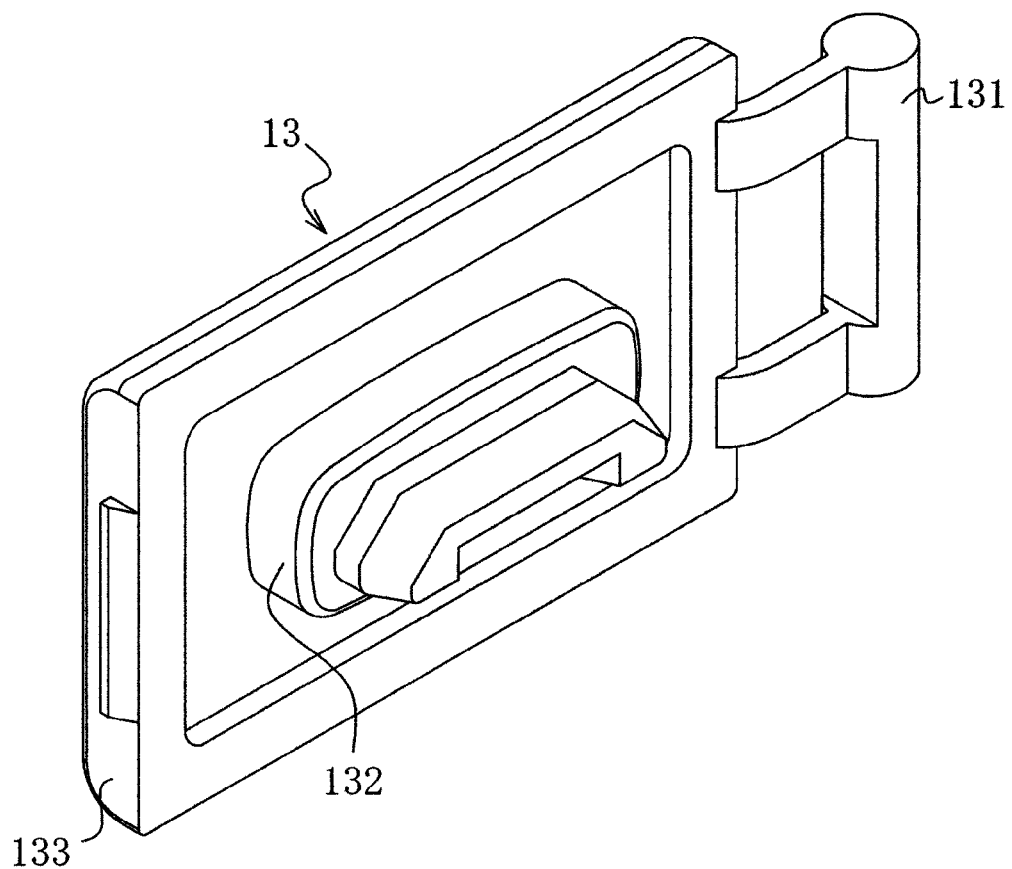
FIG. 5 is a perspective view of the cover attached to the housing.

A connector 1 of an electronic device according to the present invention is used as a charging connector for mobile phone or other connectors and accommodated in a housing 10 of an electronic device such as mobile phone, as shown in FIG. 1 to FIG. 3. The housing 10 is composed of a main body 11 and a cover body 12. The main body 11 is formed into a box shape with an opened upper surface and a front surface 111 thereof is provided with a recess 112 in the middle in which an opening 113 is created at the center. The recess 112 is provided with a cover 13 through engagement of a hinge 131 and an engaging part 114 and the recess 112 is closed in a normal state by the cover 13 that is allowed to open/close by the hinge 31 (see FIG. 5). Note that the cover 13 and a projection 132 thereof are preferably made of, for example, hard elastomer or hard resin produced by placing polycarbonate on the outer surface of hard elastomer.

The periphery of the opening 113 serves as a cylindrical mounting part 115 that is substantially square in the front view and a sealing material 6 to be described later is brought into contact with an inner circumferential surface 116 of the mounting part 115 so as to be pressed thereagainst, whereby the connector 1 is attached to the mounting part 115. The cover body 12 that is formed into a substantially rectangular plate shape in the plan view is also placed on the open side of the main body 11 and fixed to the main body 11.

Figure 4:
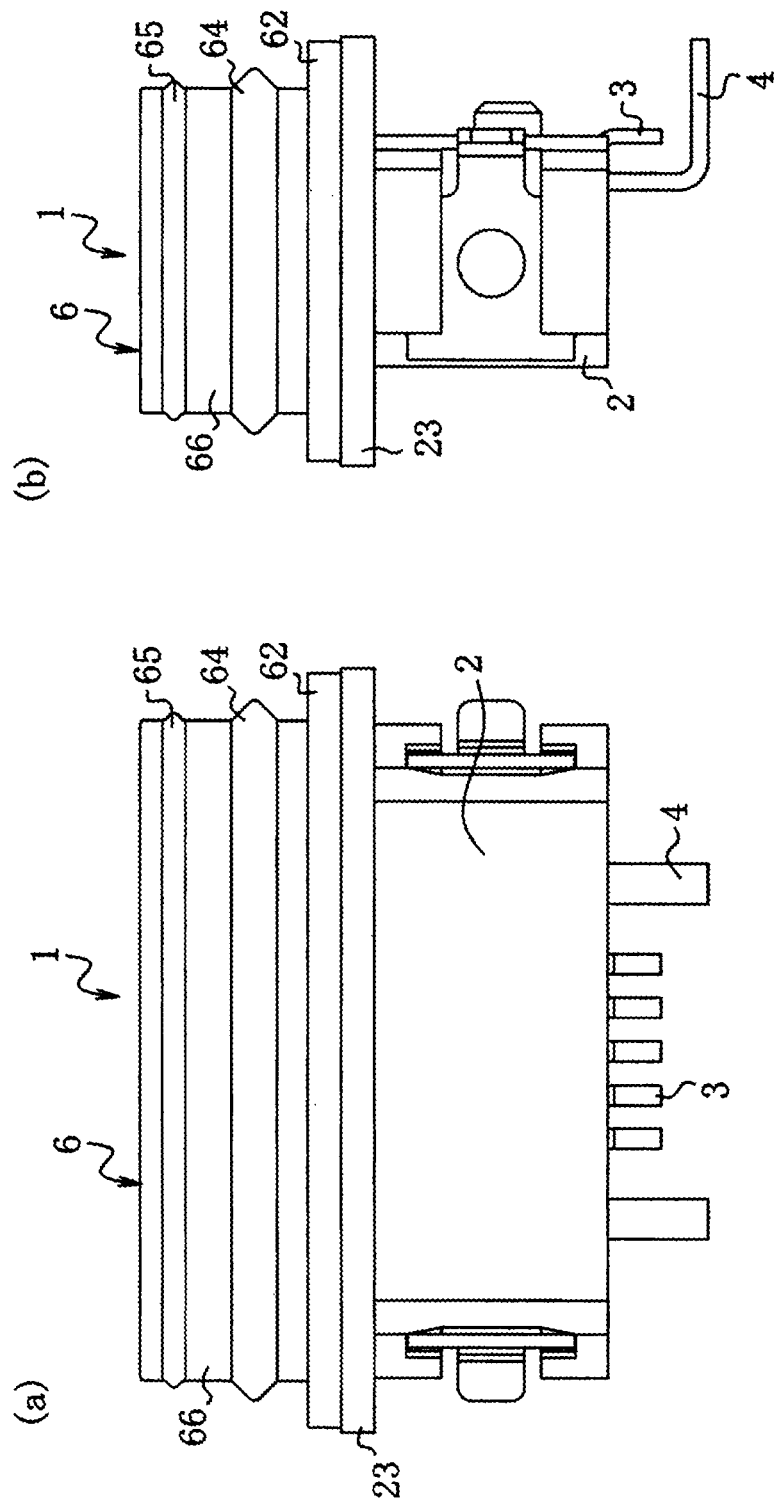
FIG. 4(a) is a plan view of the connector of an electronic device according to the first embodiment.
FIG. 4(b) is a side surface view of the connector of FIG. 4(a).

The connector 1 is as shown in FIG. 3 and FIG. 4 and provided with a substantially cylindrical case 2, contact terminals 3 and ground terminals 4 that are introduced into the case 2 and serve as terminals of the connector, a metal shell 5 that is fitted inside the case 2 and made conductive with the ground terminals 4, and the sealing material 6 that is formed in the vicinity of the end of the case 2 on a plug insertion side so as to protrude to the plug insertion side, and that is formed around the outer circumference of the case 2.

The case 2, which is substantially rectangular in the front view and formed into a substantially square cylindrical shape, is made of a hard resin such as polycarbonate resin or ABS resin or the like. In an area closer to the inner side of the case 2, a support part 21 is formed in a wall shape so as to substantially close the case 2. The support part 21 is formed with through holes 22 and the contact terminals 3 are placed and introduced into the case 2 by being inserted into the through holes 22 and supported by the support part 21. The contact terminals 3 are led from the inner side of the case 2 and electrically connected to a circuit board 8 that is placed in the housing 10.

The support part 21 is also formed with another through hole not shown and the ground terminal 4 is placed by being inserted thereinto. The ground terminals 4 are introduced into the case 2, electrically connected to the conductive shell 5 that is mounted inside the case 2 and described later, lead from an inner side of the case 2 and electrically connected to the circuit board 8. A set of the contact terminals 3 and the ground terminals 4 or a set of the contact terminals 3, the ground terminals 4 and the shell 5 corresponds to a connector-side terminal to be introduced into the case 2.

A flange 23 is formed circumferentially to protrude outward on the outer circumference of the case 2 at a substantially center in the axial direction and an engaging recess 24 is formed as a groove along an outer circumferential surface of the flange 23 on the plug insertion side. An inner end surface of the sealing material 6 to be described later comes in contact with a surface of the flange 23 on the plug insertion side and an inner end section of the sealing material 6 is engaged with the engaging recess 24. Note that the engaging recess 24 can also be formed in a punctiform manner with predetermined intervals interposed along the outer circumferential surface of the case 2 and there can also be a structure without providing the engaging recess 24.

The shell 5 is substantially rectangular in the front view and formed into a substantially quadrangular cylindrical shape with an outer diameter set to be the same as or slightly smaller than an inner diameter of the case 2, and mounted inside the case 2. A fitting groove 25 is formed on the periphery of the support part 21 on the plug insertion side and the shell 5 is fitted and attached to the fitting groove 25 by an inner end section thereof.

The sealing material 6 is made of a softer resin than a resin of the case 2 and examples of the soft resin include, for example, elastomer such as silicone elastomer or the like. The sealing material 6 is formed to protrude from the end of the case 2 to the plug insertion side and formed around the outer circumference of the case 2 so that an engaging part 61 formed to protrude inward at the end of the sealing material 6 on the inner side is engaged with the engaging recess 24. The sealing material 6 is also formed with an overhang 62 that protrudes outward at an inner end thereof so that the connector 1 is attached to the mounting part 115 by bringing the overhang 62 into contact with an end surface of the mounting part 115.

The sealing material 6 is welded to the case 2 and dissolved to be integrated with the case 2 in boundary surfaces thereof on an outer circumferential surface, the engaging recess 24 and a surface of the flange 23 of the case 2 on the plug insertion side. Note that the sealing material 6 can also be arranged in other methods such as simply fitting it to the case 2 without welding or attaching it thereto by adhesive.

Figure 7:
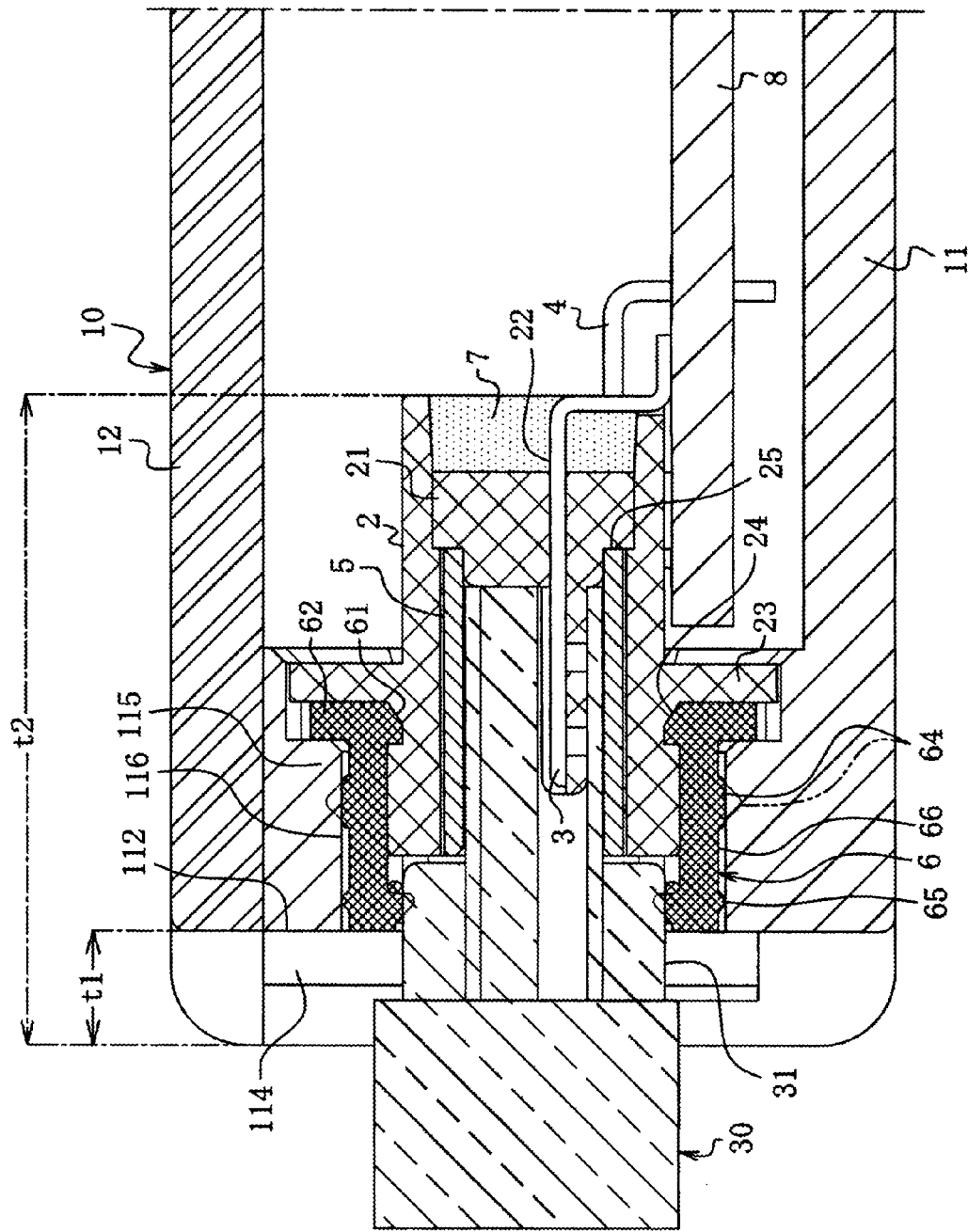
FIG. 7 is a cross sectional view along B-B line of FIG. 6(b).

A protruding section of the sealing material 6 on the plug insertion side is formed as a first convex stripe 63 so as to protrude inward along the inner circumference thereof, wherein the first convex stripe 63 is formed so as to be circumferentially pressed against and brought into contact with an outer circumferential surface of the projection 132 that is a part of the cover 13 to be inserted, and an outer circumferential surface of a contact 31 that is a part of a plug 30 to be inserted (see FIG. 3 and FIG. 7). The first convex stripe 63 is formed into a substantially dorsal fin shape in the cross sectional view a with a front side thereof disposed to the plug insertion side and the first convex stripe 63, which is frequently rubbed against the projection 132 of the cover 13 and the contact 31 of the plug 30 when the projection 132 and the contact 31 are inserted thereinto, can be brought into contact therewith in a form of falling down to a direction opposite to the plug insertion side, so that the first convex stripe 63 is configured to enable prevention of abrasion and enhancement of durability.

In a position drawn to a side opposite to the plug insertion side more than the first convex stripe 63, a second convex stripe 64 is formed to protrude outward along the outer circumference of the sealing material 6 and the second convex stripe 64 is formed so as to be circumferentially pressed against and brought into contact with the inner circumferential surface 116 of the mounting part 115 of the housing 10 of an electronic device. Although the second convex stripe 64 of this example is formed into a substantially chevron shape in the cross sectional view so as to be easily inserted into the mounting part 115 and realize high stability after insertion, it can also be formed into other shapes such as substantially semicircular shape in the cross sectional view.

Furthermore, in a position drawn to the plug insertion side more than the second convex stripe 64, a convex 65 that is shorter than the second convex stripe 64 is formed to protrude outward along the outer circumference of the sealing material 6. An outer diameter of an outer circumferential surface 66 of the sealing material 6 is formed to be slightly smaller than an inner diameter of the inner circumferential surface 116 of the mounting part 115 in the housing 10 of an electronic device, wherein the second convex stripe 64 comes in contact with the inner circumferential surface 116 of the mounting part and the convex 65 also comes in contact with the inner circumferential surface 116 of the mounting part 115. Note that the convex 65 that is formed into a circumferential convex stripe can also be configured in a punctiform manner with predetermined intervals interposed circumferentially.

Another sealing material 7 such as adhesive is also filled in a space formed by an inner peripheral wall of the case 2 and the support part 21 in order to more reliably prevent water intrusion into the circuit board 8 that is provided behind the connector 1. It is also possible to provide a structure without arrangement of another sealing material 7 by, for example, insert-molding components such as the contact terminals 3, the ground terminals 4 and the like to the case 2.

Then, the connector 1 constitutes a connection device by being mounted inside the housing 10 of an electronic device and the connector 1 is arranged in such that the sealing material 6 is inserted into the mounting part 115, wherein the second convex stripe 64 and the convex 65 are pressed against and brought into contact with the inner circumferential surface 116 of the mounting part 115. Owing to waterproof sealing applied by bringing the inner circumferential surface 116 of the mounting part 115 of the housing 10 and the second convex stripe 64 into contact with each other, water intrusion from a space between the housing 10 and the sealing material 6 into the housing 10 is prevented.

When the cover 13 is closed in the connection device in nonuse, the first convex stripe 63 of the sealing material 6 is circumferentially pressed against and brought into contact with an outer circumferential surface of the projection 132 of the cover 13 as shown in FIG. 3 in order to prevent water intrusion into the connector 1 by sealing with the use of the projection 132 of the cover 13 and the first convex stripe 63 of the sealing material 6. The first convex stripe 63 that is in contact with the outer circumferential surface of the projection 132 is in a form of falling down to a direction opposite to the insertion side of the projection 132 and it returns to a substantially dorsal fin shape in the cross sectional view when the projection 132 is pulled out.

In this waterproof structure, it is possible to set a thickness t1 of the cover main body 133 of the cover 13 to about 1.5 mm which is less than about 3 mm of the thickness t1' of the cover 210 as the above conventional example, and set a depth t2 of a portion in which the cover main body 133 and the connector 1 are installed to about 7.5 mm which is less than about 8.5 mm of the depth t2' of a portion in which the opening 220 and the connector 230 are installed. Owing to the reduction of the depth, a remaining space can be enlarged in the housing 10 of an electronic device in which components are mounted with high density.

Figure 6:
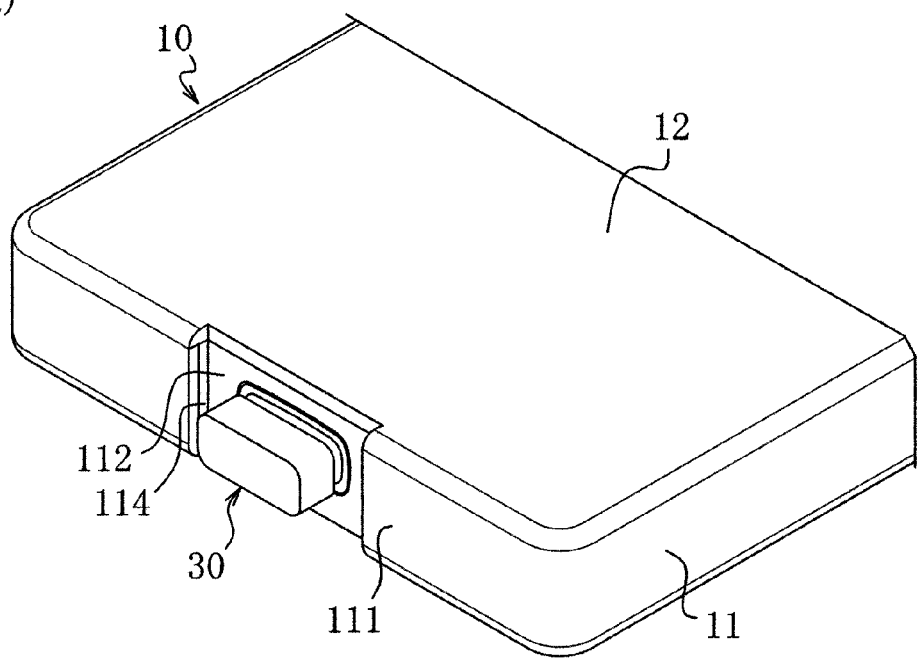
FIG. 6(a) is a partial perspective view of the housing for accommodating the connector of an electronic device according to the first embodiment, in which a plug is inserted thereinto.
FIG. 6(b) is a front view thereof.
Figure 6:
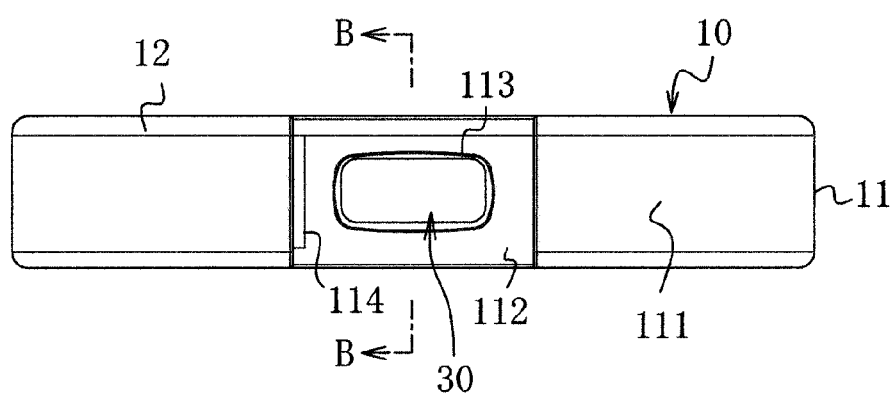
Figure 8:
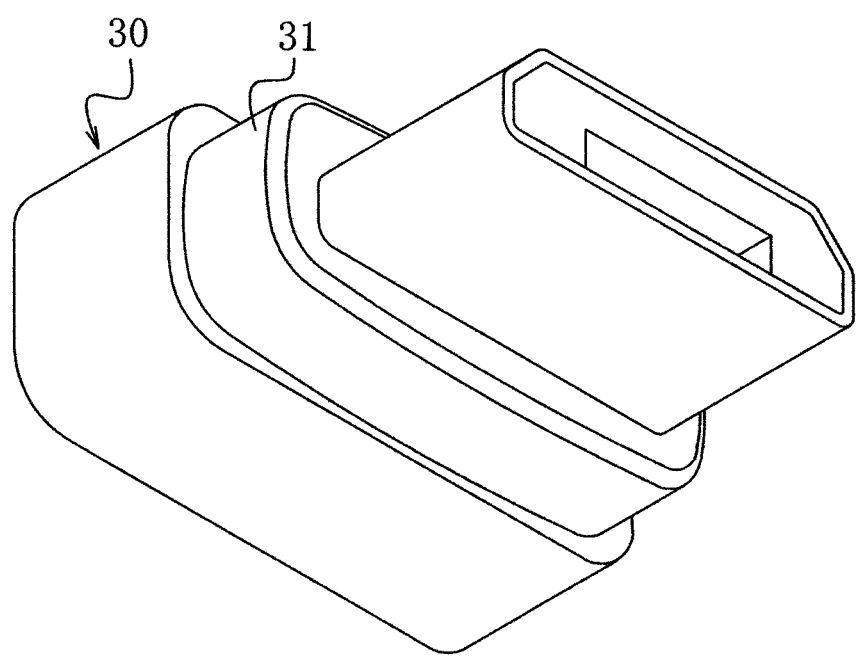
FIG. 8 is a perspective view of the plug.
Figure 9:
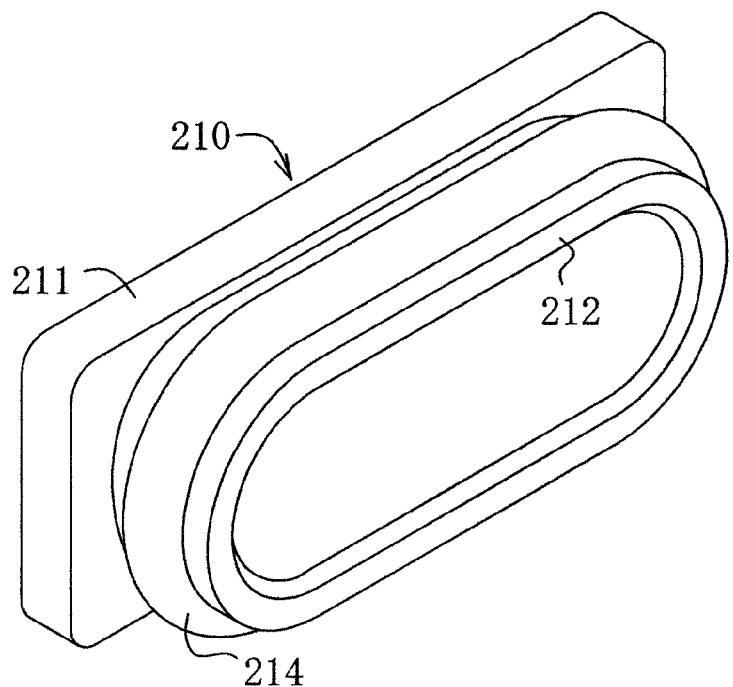
FIG. 9(a) is a perspective view of a cover as a conventional example.
FIG. 9(b) is a longitudinal cross sectional view showing a waterproof structure of a connector of an electronic device as a conventional example.
Figure 9:
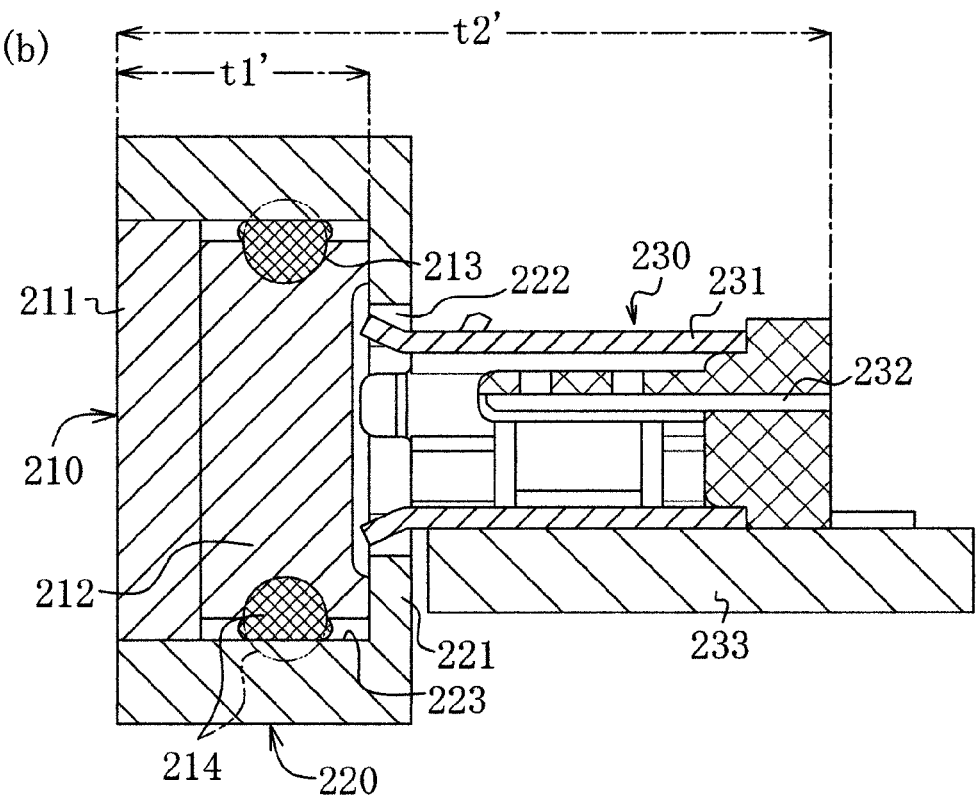

When the plug 30 is inserted in the connection device by leaving the cover 13 open, the first convex stripe 63 of the sealing material 6 is circumferentially pressed against and brought into contact with an outer circumferential surface of the contact 31 of the plug 30 as shown in FIG. 6 to FIG. 8, wherein water intrusion into the connector 1 is prevented by sealing between the contact 31 of the plug 30 and the first convex stripe 63 of the sealing material 6. The first convex stripe 63 is also in contact with an outer circumferential surface of the connector 31 in a form of falling down to a direction opposite to the plug insertion side and it returns to a substantially dorsal fin shape in the cross sectional view when the plug 30 is pulled out.

In the connector 1, the plug 30 or the waterproof structure of an electronic device according to the present embodiment, owing to waterproof sealing applied by bringing the first convex stripe 63 of the sealing material 6 into contact with a part of the cover 13 or a part of the plug 30, the cover 13 can be thin and the connector 1 can be placed in a position closer to the opening edge of the housing 10 of an electronic device. Accordingly, a remaining space in the housing 10 of an electronic device can be enlarged, the degree of freedom in designing the layout of a circuit board and wiring therefor can be improved, the number of circuits to be mounted can be increased, and a battery can be made larger. The cover 13 can also provided in a simplified structure and the housing 10 of an electronic device can be made thinner and more compact, while enabling reduction of manufacturing costs of the cover 13, reduction in the number of component parts and improvement of the yield. It is also possible to attract user's attention to the characteristics of the waterproof structure because the sealing material 6 can be visually observed by leaving the cover 13 open.

In addition, owing to the first stripe 63, a waterproof measure can be taken for both cases with the cover 13 attached and with the plug 30 inserted, so that collective waterproof measures can be taken for both cases. The first convex stripe 63 that is often rubbed against surfaces can also be in contact with surfaces in a form of falling down to a direction opposite to the plug insertion side, whereby making it possible to prevent abrasion of the first convex stripe 63 and enhance durability thereof.

Also, owing to waterproof sealing applied by bringing the inner circumferential surface 116 of the mounting part 115 of the housing 10 and the second convex stripe 64 into contact with each other, it is possible to prevent water intrusion from a space between the housing 10 and the sealing material 6 into the housing 10. Owing to the sealing material 6, collective waterproof measures can also be taken at the same time against a water intruding path from the cover 13 into the connector 1 and against a water intruding path from a space between the housing 10 and the connector 1 into the housing 1. Moreover, owing to formation of the second convex stripe 64 in a position drawn to a side opposite to the plug insertion side more than the first convex stripe 63, when the connector 1 is inserted from a side opposite to the plug insertion side into the mounting part 115 of the housing 10, an insertion distance of the connector 1 that is inserted while the inner circumferential surface 116 of the mounting part 115 is pressed by the second convex stripe 64 can be made shorter to make insertion of the connector 1 easier.

In addition, the convex 65 is used to function as a relief to be in contact with the inner circumferential surface 116 of the mounting part when the sealing material 6 fitted to the case 2 is inserted into the mounting part 115, and a clearance is provided by making an outer diameter of the outer circumferential surface 66 of the sealing material 6 fitted to the case 2 slightly smaller than an inner diameter of the inner circumferential surface 116 of the mounting part 115, whereby making it possible to insert the sealing material 6 fitted to the case 2 into the mounting part 115 in a simple manner and stabilize it in a normal position without distortion. It is further possible to prevent water intrusion from a space between the connector 1 and the housing 10 more reliably by using both the second convex stripe 64 and the convex 65 in such a configuration that the convex 65 of a circumferential convex stripe is pressed against and brought into contact with the inner circumferential surface 116 of the mounting part 115.

Moreover, by using materials such as, for example, a hard resin for the case 2 and a softer resin than the above hard resin for the sealing material 6, it is possible to maintain the shape of the case 2, improve workability in mounting operation or other operation, and prevent water intrusion from a space between the housing 10 and the sealing material 6 more reliably owing to elasticity of the sealing material 6.

It is also possible to completely prevent water intrusion from a space between the case 2 and the sealing material 6 by welding the case 2 and the sealing material 6 to each other. Another sealing material 7 provided in the inside of the case 2 also makes it possible to more reliably prevent water intrusion into the circuit board 8 placed behind the connector 1 when the connector 1 is released or in the event of malfunction of the sealing material 6 or other cases, and a waterproof measure can be taken against forgetting to close the cover 13. Furthermore, when another sealing material 7 is provided without insert-molding, it is unnecessary to prepare complicated metal molds so that cost reduction can be achieved with a reduced degradation rate and an improved degree of freedom in designing the shape of the connector 1.

Modified Examples of Embodiments

The invention disclosed in this specification includes, in addition to respective inventions, embodiment and configurations of respective examples, in an applicable range, a matter defined by modifying any of these partial configurations into other configurations disclosed in this specification, a matter defined by adding any of other configurations disclosed in the this specification to these partial configurations, or a matter defined into a generic concept by cancelling any of these partial configurations as long as a partial operational advantage can be obtained. Then, the following modified example is also included.

For example, the waterproof structure of the connector 1 according to the above embodiment can also be used to configure various kinds of electronic devices other than mobile phones and examples thereof include configurations of various kinds of electronic devices having a connector such as electronic book terminal, personal computer, digital camera and the like. The structure of the housing 10 of an electronic device can also be modified appropriately within a range of the intent of the present invention.

INDUSTRIAL APPLICABILITY

The present invention can be used for various kinds of electronic devices having a connector such as, for example, mobile phone, electronic book terminal, personal computer, digital camera and the like.

REFERENCE SIGNS LISTS 1, 230—CONNECTOR
2—CASE

21—SUPPORT PART
22—THROUGH HOLE
23—FLANGE
24—ENGAGING RECESS
25—FITTING GROOVE
3, 232—CONTACT TERMINAL
4—GROUND TERMINAL
5, 231—SHELL
6—SEALING MATERIAL
61—ENGAGING PART
62—OVERHANG
63—FIRST CONVEX STRIPE
64—SECOND CONVEX STRIPE
65—CONVEX
66—OUTER CIRCUMFERENTIAL SURFACE
7—ANOTHER SEALING MATERIAL
8, 233—CIRCUIT BOARD
10—HOUSING
11—MAIN BODY
111—FRONT SURFACE
112—RECESS
113—OPENING
114—ENGAGING PART
115—MOUNTING PART
116—INNER CIRCUMFERENTIAL SURFACE
12—COVER BODY
13—COVER
131—HINGE
132—PROJECTION
133—COVER MAIN BODY
30—PLUG
31—CONTACT
210—COVER
211—COVER MAIN BODY
212—PROJECTION
213—RECESSED GROOVE
214—O-RING
220—OPENING
221—REAR WALL
222—HOLE
223—INNER CIRCUMFERENTIAL SURFACE
t1—THICKNESS OF COVER MAIN BODY
t1'—THICKNESS OF COVER
t2—DEPTH OF INSTALLATION AREA OF COVER MAIN BODY AND CONNECTOR
t2'—DEPTH OF INSTALLATION AREA OF OPENING AND CONNECTOR

The invention claimed is:

1. A connector of an electronic device comprising:
a substantially cylindrical case;
connector-side terminals introduced into the substantially cylindrical case; and
a sealing material formed in the vicinity of an end of the substantially cylindrical case on a plug insertion side so as to protrude to the plug insertion side, and formed around an outer circumference of the substantially cylindrical case, wherein:
a first convex stripe is formed along an inner circumference of a protruding section of the sealing material, wherein the first convex stripe is formed to be circumferentially pressed against and brought into contact with an outer circumferential surface of a part of a cover to be inserted; and
a second convex stripe is formed along an outer circumference of the sealing material, wherein the second convex stripe is formed so as to be circumferentially pressed against and brought into contact with an inner circumferential surface of a mounting part of a housing of the electronic device.

2. The connector of an electronic device according to claim 1, wherein the first convex stripe is formed into a substantially dorsal fin shape in the cross sectional view with a front side thereof disposed to the plug insertion side.

3. The connector of an electronic device according to claim 1, wherein the second convex stripe is formed in a position drawn to a side opposite to the plug insertion side more than the first convex stripe.

4. The connector of an electronic device according to claim 1, wherein a convex being shorter than the second convex stripe is formed along the outer circumference of the sealing material in a position drawn to the plug insertion side more than the second convex stripe.

5. The connector of an electronic device according to claim 1, wherein another sealing material is provided behind the case.

6. The connector of an electronic device according to claim 1,
wherein the first convex stripe is formed to be circumferentially pressed against and brought into contact with both an outer circumferential surface of a part of an inserted plug and an outer circumferential surface of a part of the cover to be inserted.

7. The connector of an electronic device according to claim 6, wherein the first convex stripe is formed into a substantially dorsal fin shape in the cross sectional view with a front side thereof disposed to the plug insertion side.

8. The connector of an electronic device according to claim 6, wherein another sealing material is provided behind the case.

9. The connector of an electronic device according to claim 1, wherein the case is made of a resin and the sealing material is made of a softer resin than the resin of the case.

10. The connector of an electronic device according to claim 9, wherein a non-protruding section of the sealing material made of the softer resin is welded to the case made of the resin.

11. The connector of an electronic device according to claim 6, wherein the case is made of a resin and the sealing material is made of a softer resin than the resin of the case.

12. The connector of an electronic device according to claim 11, wherein a non-protruding section of the sealing material made of the softer resin is welded to the case made of the resin.

13. A plug of an electronic device to be inserted into a connector, the connector comprising:
a substantially cylindrical case;
connector-side terminals introduced into the substantially cylindrical case;
a sealing material that is formed in the vicinity of an end of the substantially cylindrical case on a plug insertion side so as to protrude to the plug insertion side, and that is formed around an outer circumference of the substantially cylindrical case;
a first convex stripe formed along an inner circumference of an protruding section of the sealing material, wherein a plug is inserted in such a manner that the first convex stripe is circumferentially pressed against and brought into contact with an outer circumferential surface of a part of the plug; and
a second convex stripe is formed along an outer circumference of the sealing material, wherein the second convex stripe is formed so as to be circumferentially pressed against and brought into contact with an inner circumferential surface of a mounting part of a housing of the electronic device.

14. A waterproof structure of electronic device comprising:
a substantially cylindrical case;
connector-side terminals introduced into the substantially cylindrical case;
a connector composed of a sealing material that is formed in the vicinity of an end of the substantially cylindrical case on a plug insertion side so as to protrude to the plug insertion side, and that is formed around an outer circumference of the substantially cylindrical case, and a cover to be partially inserted into the connector, wherein:
  a first convex stripe is formed along an inner circumference of an protruding section of the sealing material wherein the first convex stripe is circumferentially pressed against and brought into contact with an outer circumferential surface of a part of the cover to be inserted into the connector; and
a second convex stripe is formed along an outer circumference of the sealing material, wherein the second convex stripe is formed so as to be circumferentially pressed against and brought into contact with an inner circumferential surface of a mounting part of a housing of the electronic device.

\* \* \* \* \*